Feb. 24, 1970  B. J. CALL  3,496,799
ENERGY STORING MASS AND METHOD FOR MAKING
Filed Sept. 19, 1966
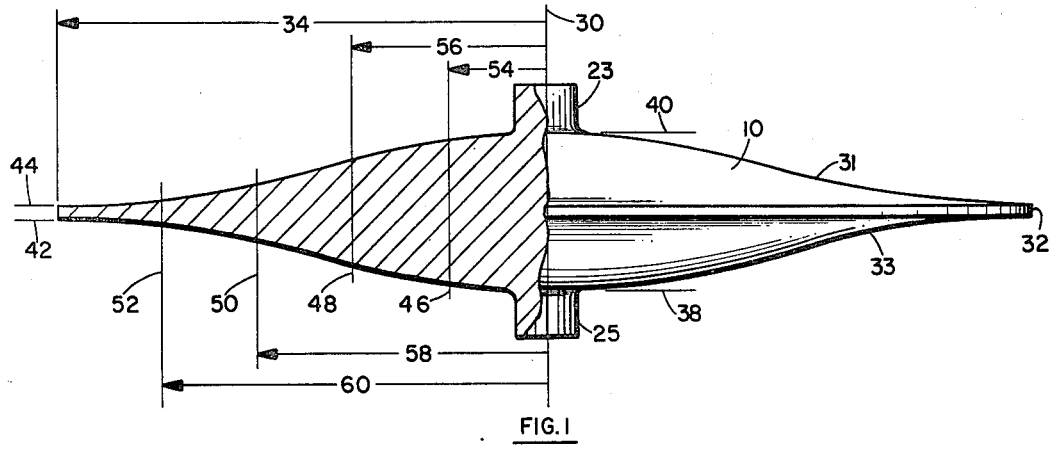
FIG. I
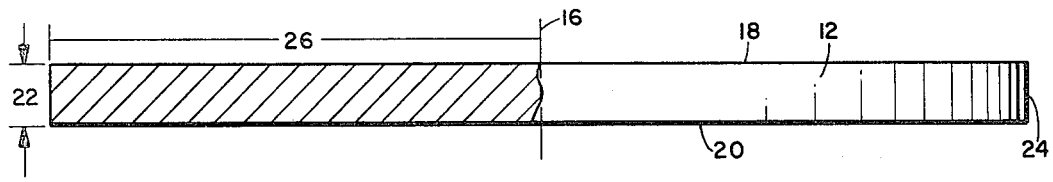
FIG. 2 (PRIOR ART)
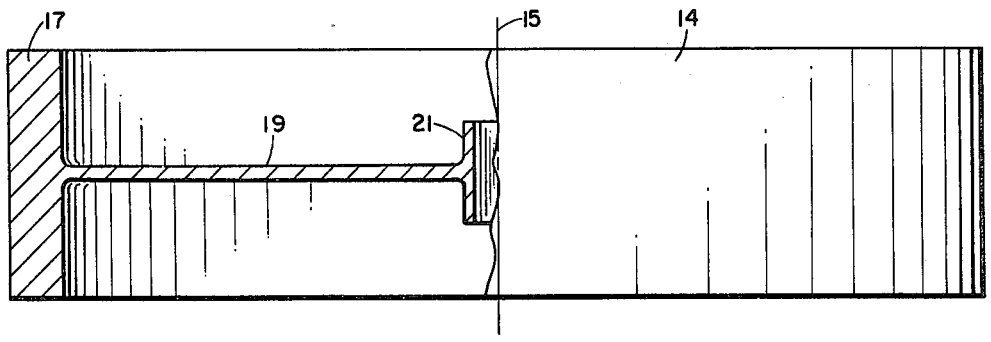
FIG. 3 (PRIOR ART)
INVENTOR.
BERNARD J. CALL
BY
ATTORNEY United States Patent Office 3,496,799
Patented Feb. 24, 1970

3,496,799
ENERGY STORING MASS AND METHOD FOR MAKING
Bernard J. Call, Manhattan Beach, Calif., assignor to North American Rockwell Corporation, a corporation of Delaware
Filed Sept. 19, 1966, Ser. No. 580,371
Int. Cl. G05g 1/00, 3/00
U.S. Cl. 74—572                     7 Claims

ABSTRACT OF THE DISCLOSURE

A flywheel is disclosed having a generally lenticular shape so as to produce substantially uniform actual stress throughout the flywheel mass during high speed rotation. The actual stress at design speed is close to the theoretical maximum stress limit of the flywheel material of construction which consist of the metal or alloy having the highest value of tensile strength to density ratio among known metals and alloys.

---

This invention concerns energy storage devices of the inertia type identified generally as flywheels, and particularly relates to flywheels wherein lightweight and maximum efficiency are of crucial importance as in the case of aerial vehicles using such devices.

The well-known types of energy storage flywheels depend for their utility on the mass-momentum relationship associated with solid bodies in motion. Several different shapes of flywheel are modernly found in wide use, all of which follow certain general design principles. Where stored energy is required to be high, the limiting factors of size, weight, rotational velocity and strength of the construction materials are balanced to achieve an optimum combination of such factors. In the prior art, two general types of flywheel shape are predominant, namely the flat disc type characterized by smooth parallel surfaces between the hub and the periphery, and the rim type having a massive peripheral portion secured to the hub by spokes or by a solid radial wheel portion.

The rim type flywheels are characterized by high tangential stress in the rim during rotation, tending to enlarge the circumference of the rim. The foregoing stress is generally characterized as hoop tension which typically comprises substantially pure tangential stress, and substantially no radial stress in the case of relatively thin rims. If the flywheel is a solid mass of substantially homogeneous material, such as a metal or alloy of uniform composition and properties, the unit stress in the rim of a rim type flywheel reaches a practical safe limit without utilizing the strength properties of the material in a radial direction to hold the body together, whereby the efficiency of the flywheel with respect to its weight-energy ratio is severely compromised. In a perfectly flat disc type flywheel of uniform thickness, the highest unit stress at maximum safe rotational speed characteristically occurs at the location of the flywheel center of rotation rather than at its periphery, and comprises substantially equal amounts of radial and tangential stress of tensile type in both cases, but the radial stress rapidly lessens and reaches zero at the outer peripheral edge. Thus, in both the mentioned dominant types of flywheel, the spectrum of stress levels occurring between the wheel center of rotation and outermost periphery and in the radial and tangential directions during rotation varies widely. Where a low stress value exists in any portion of a flywheel, either radially or tangentially, the low pressed portion is less than fully efficient with respect to its weight-energy ratio, since the stress is commensurate with the amount of energy stored.

It is further generally characteristic of flywheels that the kinetic energy stored by a flywheel is directly proportional both to the square of the rotational speed and to the moment of inertia of the flywheel mass. However, a balance or "trade-off" of performance characteristics is necessary in the choice of flywheel parameters based on such limitations as flywheel size, precessional forces, and maximum safe bearing stress during a desired rate of power extraction when the flywheel stored energy is being utilized for some purpose. Precessional force is a force on the bearings acting perpendicular to the rotation axis and is produced by application of force to change the position of the flywheel when such disturbing force is applied perpendicular to both the rotation axis and the line of precessional force while the flywheel is at high speed rotation. Precessional torque is directly proportional to rotational speed and to the moment of inertia. Thus, both the rim and flat disc type of flywheels are characterized by relatively high precessional loads in proportion to the amount of energy they store, because a substantial portion of their total mass is situated at the radially outer portion thereof, adjacent the periphery, whereby the moment of inertia is relatively high. High values of precessional torque are distinctly undesirable in flywheels mounted in aerial vehicles and the like, wherein attitudinal and directional changes of movement of the vehicle result in precessional loads on the flywheel bearings, the magnitude of such loads being greater where precessional torque load characteristics are high.

It is further characteristic of flywheels that power extraction or the rate which stored energy is withdrawn from the flywheel is directly proportional to the shaft torque times the rotational velocity, as a result of which a high extraction rate normally stresses the shaft very highly, the flywheel rotational speed being inherently limited at each given shaft size by the performance limits of the bearings which support the shaft for rotation. Thus, a high extraction rate will overstress a small diameter flywheel shaft, but a large diameter shaft is often prohibited in high speed flywheels due to limitations of bearing speed.

Accordingly, it is a principal object of the invention in this case to provide an improved flywheel capable of achieving a high ratio of actual stress to theoretical maximum stress limit throughout a greater proportion of the flywheel mass during high speed rotation.

It is another object in this case to provide flywheel means as set forth in the above object characterized by relatively low precessional torque characteristics.

It is a further object in this case to provide structure as set forth in the above objects resulting in maximum amount of stored energy per pound of flywheel weight.

It is a further object in this case to provide an improved method for determining optimum flywheel shape resulting in maximum amount of stored energy per pound of flywheel weight.

It is a further object in this case to provide a flywheel capable of a high rate of power extraction therefrom.

It is a further object in this case to provide an improved flywheel adapted for mounting by a relatively small diameter shaft and capable of high rotational flywheel speed.

It is a further object in this case to provide an improved flywheel capable of relatively low aerodynamic frictional losses during rotation at high speed.

Other important objects and advantages of the instant invention will become apparent upon a close reading of the following detailed explanation of the invention, reference being had to the accompanying drawings, wherein:

FIGURE 1 shows an edgewise elevational view, partly in cross-section, of a flywheel incorporating the inventive principles disclosed herein.

FIGURE 2 shows a view corresponding to FIGURE 1 of a flat disc type flywheel typical of the prior art, and FIGURE 3 shows a view corresponding to FIGURE 1 of a rim type flywheel typical of those known to the prior art.

The inventive concept disclosed herein includes various features which may advantageously be used individually and incorporated in part or in whole into flywheels regardless of size or shape. One such feature in the preferred embodiment discussed below to illustrate the concept in this case involves the selection of a meterial of construction having a particular dominant characteristic. It will be understood by those skilled in the art that the principles disclosed herein related to flywheel shape may be used advantageously with materials other than those specified, and the discussion which follows will be based upon use of homogeneous materials of essentially uniform composition throughout their mass. However, it is of particular significance in carrying out the inventive concept herein that the material of flywheel construction be selected on the basis of its strength to density ratio, the most desirable material being that characterized by a maximum value for the stated ratio.

It is of particular significance in the inventive concept of this case that the specific energy storage capacity of a flywheel having the novel features taught herein is directly proportional to the strength-density ratio in its material of construction. Since the specific energy, which may be expressed as inch-pounds of work stored per pound of flywheel weight, represents a direct measure of the basic energy storage efficiency of the flywheel, the material which has the highest possible strength with respect to the lowest possible density is best suited for use in such flywheel. It has been found that aluminum, while possessing a desirably low density, possesses insufficient strength to withstand the stresses imposed by rotation of a flywheel shaped according to the invention concept in this case, the operation of which involves supersonic edge speeds. Titanium has been found very advantageous in the foregoing context as a flywheel construction material; but the preferred material, although more dense than titanium, is a high strength alloy steel having the following approximate composition:

|  | Percent |
|---|---|
| Vanadium | .06–.12 |
| Molybdenum | .20–.35 |
| Phosphorus max. | .010 |
| Silicon, max. | .35 |
| Sulphur, max. | .010 |
| Nickel | 7.00–9.00 |
| Cobalt | 3.5–4.5 |
| Carbon | .42–.48 |
| Cromium | .2–.35 |
| Manganese | .10–.25 |
| Iron | Balance |

The foregoing material can repeatedly be stressed to 140,000 pounds per square inch in tension and cycled indefinitely without causing failure of the material. The term cycled as thus used refers to repeated variations of the force which produces stress in the flywheel, as normally identified with cyclic input and extraction of energy into and out of the flywheel, respectively. In the discussion set forth below, use of the stated alloy will be assumed without further specific designation in connection with the preferred embodiment illustratively disclosed. With the foregoing selection of material and using 140,000 p.s.i. as the maximum limit of stress to which any flywheel using the stated material may be safely stressed, the ratio of stress to density is about 491,000 pounds per square inch of stress for each pound per cubic inch of material density. Initially assuming a diameter of twelve inches for a flywheel, the angular velocity capable of producing tangential stress $S_t$ in the foregoing amount would be 5487 radians per second or approximately 52,400 r.p.m. This would represent a tip velocity greater than 2700 feet per second which is in excess of two times the speed of sound. In this connection, it may be noted that for each ratio of tangential stress to density in a flywheel shaped according to the teachings of this case there is a constant tip velocity which does not vary with changes of flywheel size. Since the density for a given material, if substantially uniform, is the same throughout the flywheel mass, it may further be noted that the selection of a particular maximum value of stress determines the maximum allowable tip velocity. For steels, titanium and most materials appropriate for flywheel construction, the tip velocity is normally well above sonic velocity and often ranges above twice the speed of sound. Since the energy storage capacity of a flywheel is a function of the square of the velocity, the penalties resulting from flywheel rotation below a sonic tip velocity become excessive. In the case of a twelve-inch diameter flywheel (see Table I) operating above sonic tip velocity, it has been found that the amount of power extracted in very brief periods from the flywheel during a given duty cycle may approach or even exceed 2,000 horsepower. Where a power extraction rate of the foregoing magnitude is desired, a flywheel shaft diameter not substantially less than two inches will be required.

It is a further significant feature of the inventive concept in this case that the flywheel taught herein does not have a hollow center hole to accommodate a shaft for rotation. Thus, the total energy storage capacity in such case would be greatly reduced compared with one otherwise identical but having no such axial hole.

It is a further significant feature of the inventive concept in this case that the flywheel which embodies such concept is uniformly stressed everywhere throughout its mass to the maximum practical extent, whereby a major portion of the total flywheel mass undergoes a unit stress at or close to the maximum safe limit of 140,000 p.s.i. when the material specified above is used in construction of the flywheel. However, it will be understood that the outer peripheral edge of the flywheel does not have radially directed stress in the absence of edge loading forces applied to the flywheel at its periphery. Thus, the ideal of absolute uniformity in the amount of applied stress throughout the entire flywheel mass is not, as a practical matter, attainable. However, the desired objective of substantially uniform stress in all portions other than precisely at the flywheel edge can be very closely approximated by the novel method and structure disclosed herein. To achieve absolute uniformity of unit stress throughout the mass of flywheel 10 in FIGURE 1 would involve a peripheral edge of continuously diminishing thickness extending to infinity. To approach the foregoing theoretical result, a razor sharp edge would be required. Although possessing certain advantages with respect to the energy storage to weight ratio achievable in a flywheel corresponding to item 10 in FIGURE 1 but having a razor edge, such a cross-sectional shape would be difficult to machine, more apt to overheat in the razor thin peripheral tip at maximum rotational velocity, and would be more vulnerable to tip resonance in the lower frequency range of induced vibrations at supersonic tip speeds. Accordingly, it is a significant feature of the inventive concept in this case that the flywheel taught herein avoids a razor thin tip and substitutes a substantially squarely cut outer edge 32 of finite thickness at the flywheel periphery. The configuration thus embodied in flywheel 10 shown in FIGURE 1, for example, very closely approaches the degree of substantial uniformity of stress throughout the flywheel mass which is essential if the flywheel is to store a maximum amount of energy in relation to its weight. In contrast with the mentioned razor thin edge configuration, the squared off flywheel peripheral edge 32 will be smaller in diameter (reference numeral 34 in FIGURE 1) and less sensitive to nicks, scratches, and machining imperfections than a razor thin edge, as well as possessing certain operational advantages thereover as discussed in greater detail below.

In determining the optimum shape for a flywheel conforming with the invention in this case, it is initially necessary, following selection of the material of construction as discussed above, to determine the angular velocity that corresponds to a selected outside radius ($R_o$), or to determine the resulting outside radius $R_o$ that corresponds to a selected angular velocity for rectangular cross-sectioned plain disc flywheel, which stresses the outer peripheral portion of the flywheel to the maximum allowable for such material, such as 140,000 p.s.i. in the preferred embodiment. (It is recognized that such an angular velocity would impose greater stresses on all other portions of the rectangular cross-sectioned plain disc flywheel; however, this is of no consequence to the procedure being disclosed or the end result obtained in flywheel profile.) A rectangular cross-sectioned plain disc flywheel is illustratively shown by flywheel 12 in FIGURE 2. Flywheel 12 is characterized by a pair of substantially parallel surfaces 18 and 20 whereby thickness 22 is essentially constant throughout the entire cross-section of the flywheel. Peripheral surface or tip 24 is of circular shape as defined by essentially constant radius 26 extending from center of rotation 16 to outer peripheral tip 24. The cylindrical surface defined by tip 24 in the foregoing manner is substantially normal to surfaces 18 and 20 whereby the tip may be described as square cut. An appropriate formula for determining angular velocity in a flywheel or plain disc type such as flywheel 12 is as follows:

$$\omega = \left( \frac{S_t \times 4g}{\rho \times R_0^2 \times (1-m)} \right)^{1/2}$$

and for finding a radius $R_o$ when the other variables are known:

$$R_0 = \left( \frac{S_t \times 4g}{\rho \times \omega^2 \times (1-m)} \right)^{1/2}$$

where:

$S_t$ = maximum allowable tensile stress at the outer peripheral outer edge
$\omega$ = angular velocity
$g$ = 386 in./sec.$^2$
$R_o$ = outer radius
$\rho$ = density of material lb./in.$^3$
$m$ = Poisson's ratio Following the foregoing calculation which establishes the angular velocity and peripheral radius and using the angular velocity thus established, it is necessary to solve for a new angular velocity which would be identified with a uniformly stressed flywheel where it is assumed that the outer flywheel edge is loaded in such a manner and the cross-section through the flywheel is so shaped as to cause all the material in this flywheel mass to be uniformly stressed. The formula for the reduced angular velocity is as follows:

$$\omega_s = \omega \left( 1 - \frac{m}{e^{\frac{\rho \omega^2 R_0^2}{2g(S_t)}}} \right)^{1/2} \quad (2)$$

where:

$\omega_s$ = reduced angular velocity
$e$ = 2.71828

Following the foregoing calculations, it is necessary to solve for a family of coordinates which will define the profile of the flywheel in cross-section according to Equation 3. The omission of the an edge loading causes the actual stresses throughout the flywheel to be reduced with a greater reduction occurring at the tip than at the flywheel center. Because of this the angular velocity used in Equation 3 which defines the profile will be that calculated from Equation 2 set forth above. Subsequently, when the flywheel is rotated at the angular velocity initially established in Equation 1, the result will be an increased stress at the flywheel center approximately equal to the maximum allowable stress for the material of construction. The coordinates are defined as follows:

$$t = t_o e^{\frac{\rho \omega_s^2}{2g(S_t)}(R_0^2 - R^2)} \quad (3)$$

where $t$ = thickness at radius R
$t_o$ = thickness at outside radius $R_o$

A value for $t_o$ must be assumed, as discussed in detail below.

As applied to an illustrative embodiment of a flywheel incorporating the inventive concept in this case and defined by the relationships discussed hereinabove, it may be seen that flywheel 10 comprises a substantially solid mass of homogeneous material and is provided with a pair of opposed projections or bosses 23 and 25 comprising hub mounting means for the flywheel through which energy may be applied to cause rotation of flywheel 10 or removed therefrom when desired. Flywheel 10 has a center of rotation 30 axially aligned at the center of projections 23 and 25. The oppositely facing surfaces 31 and 33 of flywheel 10 extend between hub means 23, 25 and an outer peripheral tip portion 32 defined by essentially constant radius 34 representing the distance between axis 30 and peripheral tip 32. Surfaces 31 and 33 are characterized by a reverse curvature in cross-sectional profile, being essentially convex in the portion adjacent to hub means 23, 25 and changing to a generally concave shape near outer peripheral edge 32, a profile which derives from the fact that the cross-sectional shape of surfaces 31 and 33 coincide with an exponential curve characteristic. It may further be seen from FIGURE 1 that surfaces 31 and 33 in cross-sectional profile along a plane through the center of flywheel 10 and containing axis 30 approach near parallelism where surfaces 31 and 33 intersect the surface defined by tip 32, as indicated by lines 42 and 44 in FIGURE 1.

With further reference to FIGURE 1, it may be seen that flywheel 10 incorporating the concept in this case is of discus shape and progressively decreases in thickness from a maximum proximate hub mounting means 23, 25 to a minimum proximate peripheral edge portion 32, as suggested by radial section lines 46, 48, 50 and 52 representing thickness measurements at the various radii measured from axis 30 and denoted by reference numerals 54, 56, 58 and 60, respectively. The following example of specific dimensions is offered to illustrate application of the inventive principles disclosed herein to a specific flywheel having substantially constant stress in the sense discussed hereinabove throughout the flywheel mass which is assumed to comprise the alloy described in detail hereinabove and having a maxmium permissable stress of 140,000 pounds per square inch. The density Rho for the stated material is 0.285 pound per cubic inch. The weight of the flywheel is 17.880 pounds, and the stored energy per pound of weight in the flywheel at design speed is 409,735 inch-pounds per pound. The moment of inertia I of the flywheel is .487 pound-inch-square second. The outside radius of the flywheel has been arbitrarily selected as six inches. The Poisson's ratio mu is 0.300, and the angular velocity omega is 5487.0 radians per second. The kinetic energy in the flywheel is 7,325,930 inch-pounds, and the radius of gyration K is 3.242 inches. The following tabulation shows the thickness $t$ such as represented by lines 46, 48, 50 and 52 but at a larger number of stations along the flywheel cross-section as determined by .3 inch increments of radius measured from axis 30 in FIGURE 1.

TABLE I

| Radius | Thickness (T) | S (tangential) | S (radial) |
|---|---|---|---|
| 6.000 | 0.100 | 99718 | 0 |
| 5.700 | 0.131 | 109953 | 34117 |
| 5.400 | 0.170 | 117388 | 58898 |
| 5.100 | 0.218 | 122848 | 77100 |
| 4.800 | 0.275 | 126902 | 90614 |
| 4.500 | 0.342 | 129944 | 100752 |
| 4.200 | 0.419 | 132248 | 108433 |
| 3.900 | 0.506 | 134010 | 114307 |
| 3.600 | 0.603 | 135369 | 118838 |
| 3.300 | 0.709 | 136426 | 122359 |
| 3.000 | 0.821 | 137252 | 125113 |
| 2.700 | 0.939 | 137902 | 127279 |
| 2.400 | 1.058 | 138414 | 128986 |
| 2.100 | 1.175 | 138818 | 130332 |
| 1.800 | 1.287 | 139135 | 131389 |
| 1.500 | 1.391 | 139382 | 132211 |
| 1.200 | 1.481 | 139570 | 132839 |
| 0.900 | 1.556 | 139708 | 133300 |
| 0.600 | 1.612 | 139803 | 133615 |
| 0.300 | 1.646 | 139858 | 133800 |
| −0.000 | 1.658 | 139876 | 133860 |

It may be seen that each of the foregoing figures for stress and thickness at the various radii are calculable from the formulations discussed in greater detail hereinabove. Thus, using Formulas 1, 2 and 3, the variable parameters associated with flywheel 10 and its material of construction illustratively produce the following values in the table set forth above for a radius corresponding to line 56 in FIGURE 1 to produce a flywheel thickness value corresponding with line 48 in the same figure:

In Equation 1

$$S_t = \frac{\rho \times R_o^2 \times \omega^2 \times (1-m)}{4g}$$

$S_t = 140{,}000$ lb./in.$^2$
$\rho = .285$ lb./in.$^3$
$R_o = 6$ in.
$m = .3$ (Poisson's ratio)
$g = 386$ in./sec.$^2$ $$140{,}000 \text{ lb./in.}^2 = \frac{.285 \text{ lb./in.}^3 \times (6 \text{ in.})^2 \times \omega^2 \times (1-.3)}{4 \times 386 \text{ in./sec.}^2}$$

$\omega^2 = 30.1 \times 10^6$
$\omega = 5487$ radians/sec.

In Equation 2

$$\omega_s = \omega \left(1 - \frac{m}{e^{\frac{\rho \omega^2 R_o^2}{2g \times S_t}}}\right)^{1/2}$$

$\omega = 5487$ radian/sec.
$m = .3$
$\rho = .285$ lb./in.$^3$
$R_o = 6$ in.
$g = 386$ in./sec.$^2$
$S_t = 140{,}000$ lb./in.$^2$ $$\omega_s = 5487 \left(1 - \frac{.3}{e^{\frac{.285 \times (5487)^2 \times 36}{2 \times 386 \times 140{,}000}}}\right)^{1/2}$$

$$\omega_s = 5487 \left(1 - \frac{.3}{e^{2.857}}\right)^{1/2}$$

$\omega_s = 5487 \, (.9913) = 5439$ radians/sec.

In Equation 3

$$t = t_o e^{\frac{\rho \omega_s^2}{2g(S_t)}(R_o^2 - R^2)}$$

$R = 2.7$ in.

$$t = t_o \times e^{\frac{.285 \times (5439)^2 (36 - 7.29)}{2 \times 386 \times 140{,}000}}$$

$t = .1 \times e^{2.24}$
$t = .1 \times 9.39 = .939$ in.

The actual stress S(tangential) and S(radial) that appears in Table I is the assumed maximum stress of 140,000 lb./in.$^2$, modified by the absence of an edge load and further modified by the increase in angular velocity.

$$S(\text{radial}) = S_t \times \frac{(t - t_o)}{t} \times \frac{\omega^2}{\omega_s^2}$$

$$= 140{,}000 \text{ lb./in.}^2 \times \frac{(.939 - .1)}{.939} \times \frac{5487^2}{5439^2}$$

$$= 127{,}300 \text{ lb./in.}^2$$

The stress reduction of $S_t$ in a tangential direction due to the absence of an edge load is also modified by poissons ratio ($m$) therefore, $$S(\text{tangential}) = S_t \times \frac{(t - t_o \times m)}{t} \times \frac{\omega^2}{\omega_s^2}$$

$$= 140{,}000 \text{ lb./in.}^2 \times \frac{(.939 - .1 \times .3)}{.939} \times \frac{5487^2}{5439^2}$$

$$= 137{,}900 \text{ lb./in.}^2$$

The procedure disclosed herein for establishing a family of profile dimensions for a flywheel of particular construction material and speed or radial limits is characterized by stresses which are substantially the same throughout the flywheel mass during rotation thereof, and which remain much higher toward the outer peripheral edge than stresses in the plain disc such as shown by FIGURE 2 in this case. The result of the foregoing stress characteristics is that approximately 37 percent more energy per pound of flywheel weight is stored by the optimum shape shown by FIGURE 1 in this case than that attainable by the structure shown in FIGURE 2. The theoretical maximum in which all material is stressed to its maximum limit under centrifugal loading is approached by the novel flywheel shape disclosed herein to about 98.7 percent. The most efficient rim type flywheel such as shown in FIGURE 3 of this case is inherently capable of reaching only 50 percent of the maximum material strength limit, while the flat disc type flywheel such as shown by FIGURE 2 can reach only about 74 percent of the maximum strength of the construction material.

It is a further significant feature of the concept disclosed herein that flywheel 10 shown in FIGURE 1 stresses its material of construction in planes at right angles, namely by radial stress and tangential stress, and therefore gains maximum energy storage through high rotational speed instead of having a large moment of inertia rotating at a low speed. Due to this operational characteristic, it will be understood that the flywheel thickness is greater near the hub, which allows high horsepower extraction, and results in precessional loads being much smaller compared to other flywheel configurations such as the rim type shown illustratively in FIGURE 3. The foregoing advantages provide a combination of beneficial results unequalled by conventional flywheels known to the prior art and particularly adapt the flywheel disclosed herein for use in aircraft or space vehicles characterized by very crowded internal conditions and critical need for maximum efficiency and minimum weight.

With further regard to Equation 3, it is to be observed that the thickness dimensions of the flywheel at all points bear a certain qualitative relationship to each other, and the initial assignment of a specific numerical value for the flywheel thickness at a particularly convenient reference point such as $T_o$ can be made. Such a selection is necessarily based upon such practical considerations as the minimum edge thickness which can be precision machined and which will not result in complex and unpredictable vibration or structural failure characteristic during maximum flywheel operational speeds and loads. Use of Equations 1, 2 and 3 in the manner disclosed herein results in a precise and specific flywheel configuration having particular physical properties such as weight and moment of inertia of the flywheel which can be determined after the flywheel configuration is determined. As a practical matter, while the thickness value for $T_o$ can be any convenient value, the generally acceptable range is from .05 to .2 inch for flywheels mounted in aerial vehicles, but the preferred value is .1 inch. Using the configurations which result from Equations 1, 2 and 3, and assuming that the edge thickness is .1 inch, the resulting flywheel thickness at the center of rotation of the flywheel is between about 1.0 inch and about 2.5 inches when high strength materials of flywheel construction are selected from those metals and alloys commonly associated with highly stressed industrial machinery, including low carbon steel alloys and the like.

After a specific flywheel configuration is evolved from the formulas disclosed herein, if the resultant weight and moment of inertia are found to be excessive or otherwise unsuitable in a given case, the adjustment to new thickness dimensions may be accomplished by a direct ratio, provided that the overall proportion of the incremental thickness dimensions are maintained constant relative to each other.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

I claim:
1. An energy storing member for rotation about a stationary axis therethrough, comprising:
   a solid mass of material, said mass having a round finitely thin distal edge at its periphery defined by a constant radial distance from said axis,
   said mass further having a center portion extending between said axis and said edge, said center portion being of maximum thickness proximate said axis and of minimum thickness proximate said edge,
   said solid mass being symmetrically contoured in cross-section about said axis, and
   said center portion having a cross-sectional thickness diminishing non-uniformly from said maximum to said minimum according to the formula:

$$t = t_o e^{\frac{\rho \omega_s^2}{2g(S_t)} (R_o^2 - R^2)}$$

wherein:
   $t$ = the thickness of said mass at a distance from its center of rotation equal to R
   $t_o$ = the thickness of said mass at its outermost periphery defined by said edge
   $e$ = approximately 2.71828
   $\rho$ = the density of said material
   $\omega$ = the angular velocity due to said rotation sufficient to produce the maximum kinetic energy storage level of said mass
   $g$ = the acceleration due to gravity
   $S_t$ = the maximum allowable tensile unit stress for the material of construction
   $R_o$ = the radius of said peripheral edge measured from said center
   $R$ = the radius of a cross-sectional increment through said mass at the location of said thickness.

2. An energy storing member of generally discus shape for rotation about an axis, comprising:
   a solid mass of material having two opposing side surfaces and a round peripheral edge, said opposing side surfaces having symmetrical cross-sectional profile in a diametral plane containing said rotation axis, said profile having the shape of an exponential curve, said opposing side surfaces of said mass in said profile being substantially parallel proximate said axis and substantially parallel proximate said peripheral edge.

3. The structure set forth in claim 2 above, wherein: said material is selected from those metals or alloys having a high ratio of maximum tensile strength to density, above 300,000 pounds per square inch of stress for each pound per cubic inch of density.

4. The structure set forth in claim 2 above, wherein: said material comprises an alloy having the composition:

|  | Percent |
| --- | --- |
| Vanadium | .06–.12 |
| Molybdenum | .20–.35 |
| Phosphorus, max. | .010 |
| Silicon, max. | .35 |
| Sulphur, max. | .010 |
| Nickel | 7.00–9.00 |
| Cobalt | 3.5–4.5 |
| Carbon | .42–.48 |
| Chromium | .2–.35 |
| Manganese | .10–.25 |
| Iron | Balance |

5. In a method of making a flywheel having a preselected material of construction and a predetermined radius, the steps of:
   determining the angular velocity of a flywheel of plain disc type having said radius and construction material according to the formula:

$$\omega = \left( \frac{S_t \times 4g}{\rho x_o^2 \times (1-m)} \right)^{\frac{1}{2}}$$

where:
   $S_t$ = maximum safe tensile stress for said material of construction
   $\omega$ = angular velocity
   $g$ = acceleration due to gravity
   $R_o$ = said predetermined radius
   $\rho$ = density of said construction material
   $m$ = Poisson's ratio and further including the step of determining a new angular velocity $\omega_s$ at which said flywheel would rotate if said construction material were substantially uniformly stressed throughout its mass according to the formula:

$$\omega_s = \omega \left( 1 - \frac{m}{e^{\frac{\rho \omega^2 R_o^2}{2g(s_t)}}} \right)^{\frac{1}{2}}$$

wherein:
   $e$ = approximately 2.7183 and thereafter determining the thickness of said flywheel at a plurality of incremental radii R according to the formula:

$$t = t_o e^{\frac{\rho \omega_s^2}{2g(s_t)} (R_o^2 - R^2)}$$

wherein:
   $t$ = said flywheel thickness at each incremental radius R and wherein
   $t_o$ is the flywheel thickness at the outer periphery of said flywheel, and forming said flywheel with said thicknesses.

6. In a method of making a flywheel having a preselected material of construction and a predetermined maximum angular velocity, the steps of:
   determining the radius of a flywheel of plain disc type having said angular velocity and said construction material according to the formula:

$$R_o = \left( \frac{S_t \times 4g}{\rho \times \omega^2 \times (1-m)} \right)^{1/2}$$

wherein:
   $S_t$ = maximum safe tensile stress for said material of construction
   $R_o$ = said radius
   $\omega$ = said predetermined maximum angular velocity
   $g$ = acceleration due to gravity
   $\rho$ = density of said construction material
   $m$ = Poisson's ratio and further including the step of determining a new angular velocity $\omega_s$ at which said flywheel would rotate if said construction material were substantially uniformly stressed throughout its mass according to the formula:

$$\omega_s = \omega \left(1 - \frac{m}{e^{\frac{\rho \omega^2 R_o^2}{2g(S_t)}}}\right)^{1/2}$$

wherein:
$e$ = approximately 2.7183 and thereafter determining the thickness of said flywheel at a plurality of incremental radii R according to the formula:

$$t = t_o e^{\frac{\rho \omega_s^2}{2g(S_t)}(R_o^2 - R^2)}$$

wherein:
$t$ = said flywheel thickness at each incremental radius R and wherein
$t_o$ is the flywheel thickness at the outer periphery of said flywheel, and forming said flywheel with said thicknesses.

7. An energy storing flywheel for high speed rotating about a single stationary axis therethrough, consisting of:
a solid metallic mass having a thin distal edge at its periphery defined by a constant radial distance from said axis,
said mass further having a center portion extending between said axis and said edge, said center portion being of maximum thickness proximate said axis and of minimum thickness proximate said edge,
said solid mass being symmetrically contoured in cross-section about said axis, and
said center portion having a cross-sectional thickness diminishing non-uniformly from said maximum to said minimum at a rate sufficient to maintain the unit stress in said mass substantially constant between said axis and said edge during said high speed rotation.

References Cited

UNITED STATES PATENTS

| | | | |
|---|---|---|---|
| 998,734 | 7/1911 | Alexanderson | 74—572 |
| 2,068,198 | 1/1937 | Seifarth | 74—214 |

FOREIGN PATENTS

| | | |
|---|---|---|
| 20,059 | 11/1910 | Great Britain. |
| 251,865 | 10/1912 | Germany. |

FRED C. MATTERN, JR., Primary Examiner

F. D. SHOEMAKER, Assistant Examiner